United States Patent [19]
Furlette et al.

[11] 4,411,355
[45] Oct. 25, 1983

[54] AUTOMATIC ACCUMULATING TRANSFER MECHANISM

[75] Inventors: James L. Furlette; Donald A. Stadler, both of Fenton, Mich.

[73] Assignee: Excel Corporation, Fenton, Mich.

[21] Appl. No.: 959,030

[22] Filed: Nov. 8, 1978

[51] Int. Cl.³ .............................................. B65G 25/10
[52] U.S. Cl. .................................................. 198/718
[58] Field of Search ....................... 198/718, 744, 751

[56] References Cited
U.S. PATENT DOCUMENTS

| | | | |
|---|---|---|---|
| 3,385,418 | 5/1968 | Broser | 198/718 |
| 3,547,254 | 12/1970 | Manetta | 198/718 |
| 3,557,943 | 1/1971 | Broser | 198/744 |
| 3,687,275 | 8/1972 | Broser | 198/751 |
| 3,794,158 | 2/1974 | Greenwood, Jr. | 198/718 |

Primary Examiner—Jeffrey V. Nase
Attorney, Agent, or Firm—Gifford, Van Ophem, Sheridan & Sprinkle

[57] ABSTRACT

An automatic accumulating transfer mechanism is provided comprising a frame having a pair of spaced and substantially parallel support rails secured near the top of the frame and upon which a series of workpieces are slidably mounted. Each workpiece is positioned at a work station defined along the support rails at evenly spaced intervals from each other. A plurality of pusher dogs are longitudinally slidably mounted to the frame at spaced intervals from each other and so that one pusher dog is associated with each work station. Moreover, each pusher dog is pivotal between an upper workpiece engaging position and a lower workpiece clearing position. A reciprocal drive device longitudinally moves the pusher dogs in unison with each other from its associated work station and to the next forward work station while a knockdown bar moves all of the pusher dogs to their lower position at or near the forwardmost travel of the pusher dogs. A detector lever is associated with each work station and, in the absence of a workpiece at the work station, pivots upwardly so that a cam surface on the lever engages a cam pin on the pusher dog and pivots the pusher dog to its upper workpiece engaging position at or near the rearwardmost travel of the pusher dogs. This upward pivotal action of the pusher dog at the vacant work station in turn pivots all of the rearward pusher dogs to their upper position via link bars secured between adjacent pusher dogs.

9 Claims, 8 Drawing Figures

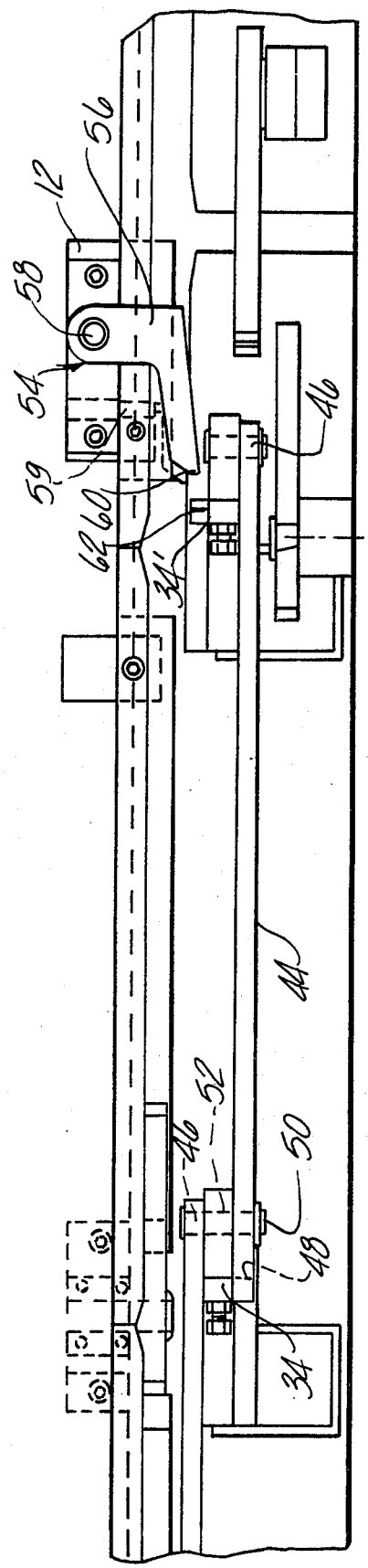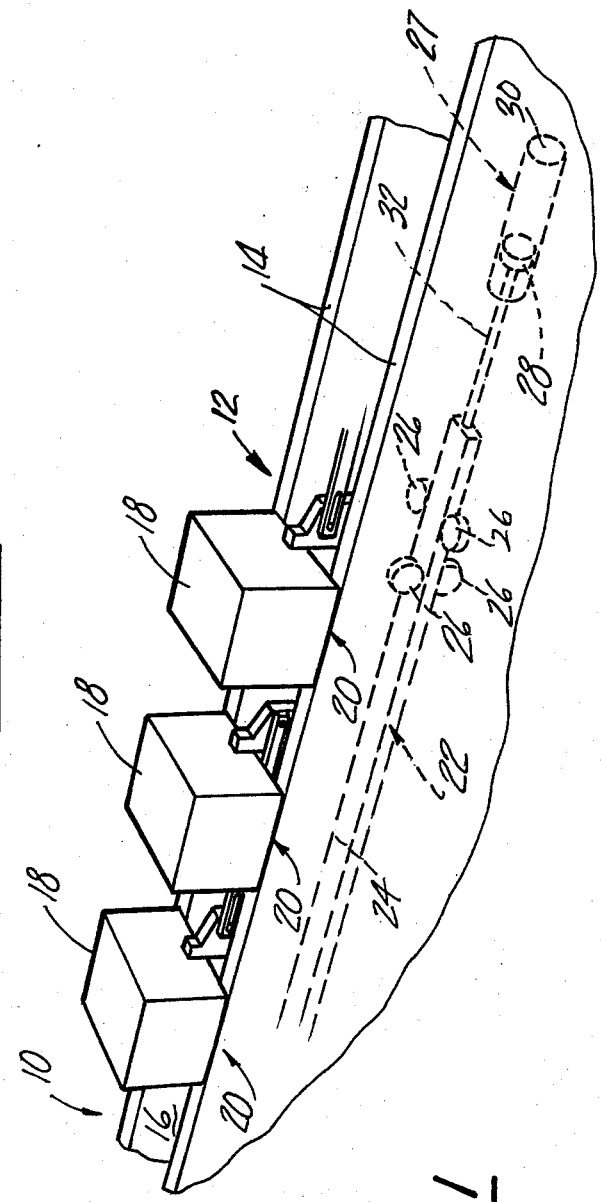

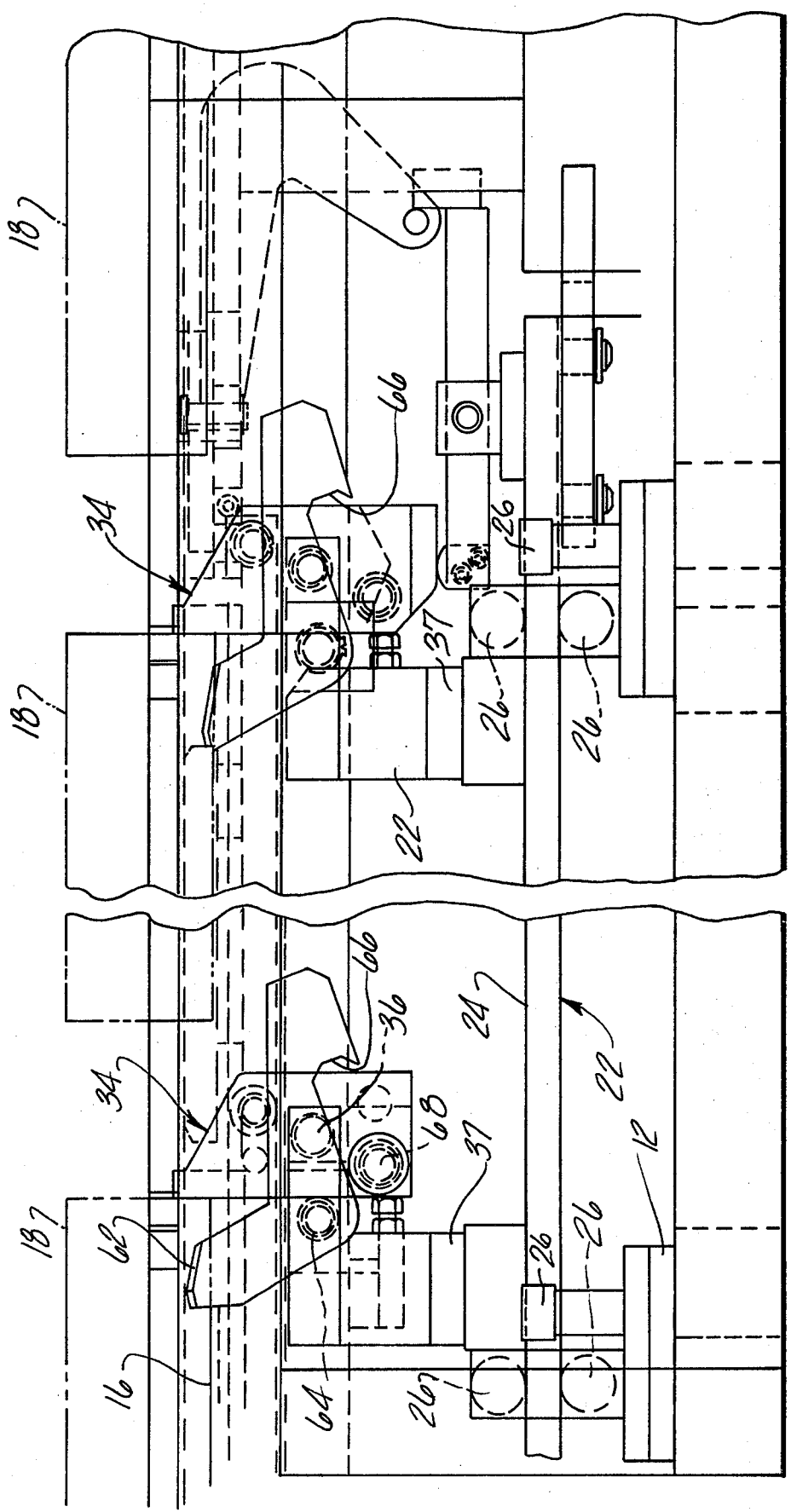

AUTOMATIC ACCUMULATING TRANSFER MECHANISM

BACKGROUND OF THE INVENTION

I. Field of the Invention

The present invention relates generally to mechanical transfer mechanisms and, more particularly, to such a mechanism with automatic accumulating means.

II. Description of the Prior Art

Conveyors and conveyor systems are currently oftentimes employed in manufacturing plants and facilities for transporting parts or workpieces throughout the manufacturing plant. In one type of conveyor system, the parts or workpieces are longitudinally slidably supported along a conveyor track and incrementally moved from one work station to the next by a reciprocating series of pusher dogs. These dogs conventionally are pivotal between an upper workpiece engaging position during its forward motion and a lower or workpiece clearing position during retraction of the pusher dogs from their most forward to their most rearward position. Otherwise, the pusher dogs would interfere with the workpieces or parts positioned upon the track during their rearward movement or retraction.

Conventionally, the pusher dogs are extended and retracted by any of a number of reciprocal drive means so that the pusher dogs all move in unison with each other for a single conveyor system. Consequently, the parts or workpieces positioned upon the conveyor track are likewise incrementally moved from one work station and to the next forward work station in unison with each other. One disadvantage, however, of the conveyor systems of this type is that a vacant space on the conveyor track caused by the absence of a workpiece at that work station will be moved along the conveyor track in unison with the parts or workpiece. These vacant spaces along the conveyor track, of course, are disadvantageous since the conveyor system is not used at its maximum capability. Moreover, the lack of a workpiece or part at a designated work station in predetermined intervals can cause work interruptions and even a stoppage of the entire manufacturing line.

There have, however, been previously known accumulating conveyor systems in which the pusher dogs are selectively actuated or moved to their upper work engaging position in dependence upon the absence of a workpiece or part from a predetermined work station. One conveyor system of this type is disclosed in U.S. Pat. No. 3,557,943 which issued on Jan. 26, 1971, to Richard Broser.

In the Broser patent, an elongated detector arm is pivotally mounted to the conveyor frame and is movable between an actuating and nonactuating position. In the actuating position, one end of the detector arm is positioned above the conveyor track at one work station due to a lack of a workpiece at that work station while the other end of the detector arm engages and pivots upwardly the next rearwardly pusher dog. The pivoting of the pusher dog to its workpiece engaging position in turn pivots all pusher dogs rearwardly of it to their upper workpiece engaging position. Conversely, a workpiece positioned at the forward work station will pivot the detector arm to its lower or nonactuating position in which case the next rearwardly pusher dog remains in its lower or workpiece clearing position.

One disadvantage of the Broser device, however, is that the detector arm must, of necessity, extend for the entire length between adjacent work stations, i.e. from the forward work station and to the next rearward work station. Therefore, when the work stations are positioned relatively far apart from each other, the detector arms become equally as long, bulky and expensive in construction.

SUMMARY OF THE PRESENT INVENTION

The present invention overcomes the above mentioned disadvantages of the previously known conveyor systems by providing an improved accumulating conveyor system.

In brief, the conveyor according to the present invention comprises a frame having a pair of spaced and substantially parallel support rails secured thereto and upon which a series of workpieces or parts are slidably mounted. A plurality of equal distantly spaced work stations are defined along the support rails at predetermined intervals from each other.

A shuttle assembly is longitudinally slidably mounted along the conveyor frame and reciprocally driven by conventional reciprocal drive means between an interval corresponding to the interval between adjacent work stations. A plurality of pusher dogs are pivotally secured to the shuttle assembly and are pivotal between an upper workpiece engaging position and a lower workpiece clearing position. One pusher dog is associated with each work station along the conveyor track.

A link bar is longitudinally positioned between each adjacent pair of pusher dogs. Each link bar is connected by a pin and slot arrangement to the forward pusher dog and is rotatably secured to the rearward pusher dog. At the initiation of retraction of the shuttle assembly from its most extended and toward its most retracted position, a knockdown means engages the link bar on the rearwardmost pusher dog thus driving the rearwardmost pusher dog to its lower workpiece clearing position. This pivotal action of the rearwardmost pusher dog in turn pivots all of the pusher dogs on the shuttle assembly to their lower workpiece clearing position via the link bars.

A detector arm is also associated with each work station and is movable between an actuating position, in which a portion of the detector arm extends above the conveyor track, and a nonactuating position in which the upper end of the detector arm is below the conveyor track. During operation, a workpiece at the work station will move the detector arm to its lower or nonactuating position while, conversely, the absence of a workpiece at a particular work station will permit the detector arm associated with that work station to move to its upper or actuating position.

With the detector arm in an actuating position, indicating an absence of a workpiece at that work station, at or near the rearwardmost position and during the retraction of the shuttle assembly, a cam surface on the detector arm engages a cam pin on the pusher dog associated with that work station which pivots the pusher dog to its upper workpiece engaging position.

The pivoting of the pusher dog to its upper workpiece engaging position by the detector arm simultaneously moves all pusher dogs rearwardly of the actuated pusher dog to their upper workpiece engaging position via the link bars between the pusher dogs. The pusher dogs forwardly of the most forward actuated pusher dog, however, will remain in their lower workpiece clearing position due to the pin and slot connection between the link bar and the forward pusher dog. The actuated pusher dog will slightly retract the link bar extending forwardly from it but will only move the pin to the forward position of the link bar slot so that the forward pusher dog remains in its lower position.

Longitudinal extension of the shuttle assembly from its retracted position with the actuated pusher dog and all pusher dogs rearwardly of it will thus shift the workpieces on the conveyor track. At the initiation of retraction of the shuttle assembly, the knockdown means again returns all pusher dogs to their lower workpiece clearing position and the cycle is again repeated.

The conveyor assembly according to the present invention is thus advantageous in that the detector arm is associated with each work station and actuates only the pusher dog likewise associated with that work station. Consequently, the previous requirement of extending the detector arms longitudinally from one work station and to the next rearwardly work station is eliminated.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a diagrammatic perspective view showing a transfer mechanism of the present invention;

FIG. 2 is a fragmentary side view showing a transfer mechanism of the present invention;

FIG. 8 is a top plan view of a portion of a transfer mechanism of the present invention.

DETAILED DESCRIPTION OF THE PRESENT INVENTION

Figure 3:
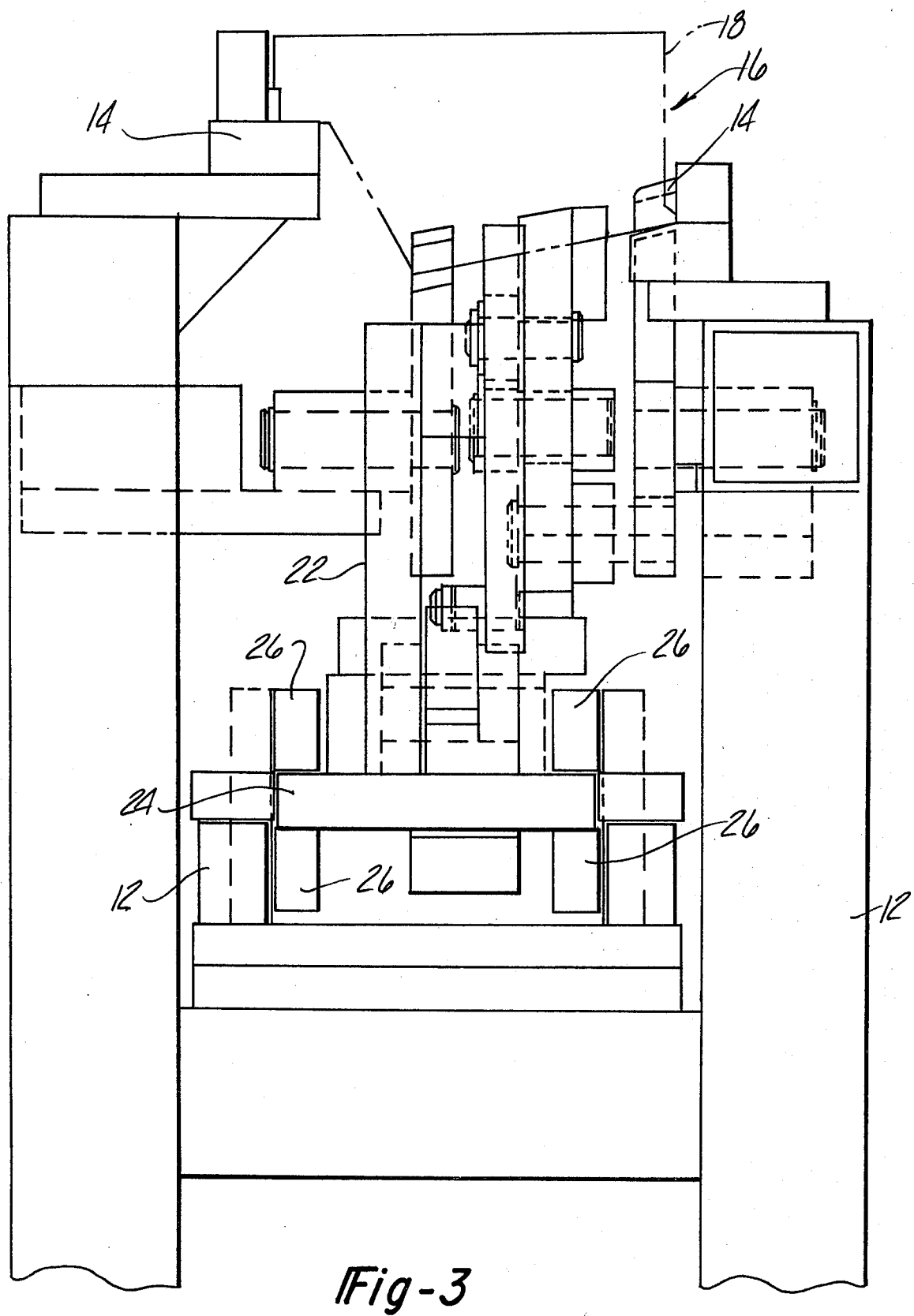
FIG. 3 is a transverse sectional view illustrating a transfer mechanism of the present invention.

With reference first to FIG. 1, an accumulating conveyor 10 according to the present invention is thereshown comprising a frame 12 having a pair of spaced and parallel support rails 14 along the top of the frame. The support rails 14 define a conveyor track 16 along which a plurality of spaced workpieces 18 are slidably disposed at spaced intervals from each other. A plurality of work stations 20 are defined along the conveyor track 16 at equidistantly spaced intervals from each other. As will become hereinafter apparent, means are provided for incrementally propelling the workpiece from one work station 20 onto the next forward work station 20.

With reference now to FIGS. 2 and 3, the means for incrementally propelling the workpieces 18 along the conveyor track 16 is thereshown and includes a shuttle assembly 22 having a flat guide member 24 which extends longitudinally along the frame 12. Pairs of vertically spaced rollers 26 are secured to both sides of the frame 12 at longitudinally spaced intervals. The lateral sides of the guide member member 24 are positioned between rollers 26 so that the shuttle assembly 22 is longitudinally slidable within the frame 12 for a distance at least equal to the distance between adjacent work stations 20.

Although any means 27 can be employed to reciprocally drive the shuttle assembly 22 along the conveyor frame 12, as shown in FIG. 1, a piston 28 and cylinder 30 arrangement is provided with the cylinder 30 connected to the conveyor frame 12 while the piston 28 is connected to the shuttle assembly 22 by a connecting rod 32. The extension and retraction of the piston 28 within the cyliner 30 thus reciprocally drives the shuttle asembly 22 for the distance equal to the distance between the adjacent work stations 20.

With reference now to FIG. 2, a plurality of pusher dogs 34 are pivotally mounted by a pivot pin 36 to a like member of upright members 37 on the shuttle assembly 22 at spaced intervals so that one pusher dog 34 is associated with each work station 20. Each pusher dog 34 moves in unison with the shuttle assembly 22 from its associated station 20 and to the next forward work station 20 upon action of the reciprocating drive means 27.

Figure 4:
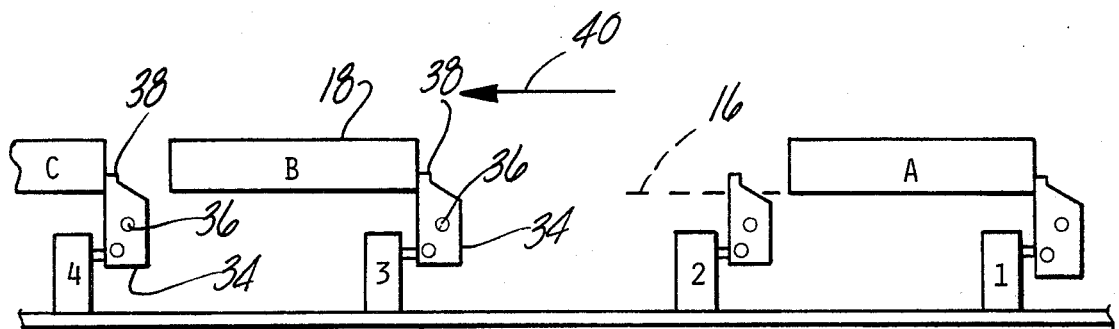
FIGS. 4-7 are diagrammatic side views illustrating the operation of a transfer mechanism of the present invention and with parts removed for clarity.

Each pusher dog 34 is pivotal about its pivot pin 36 between an upper workpiece engaging position (FIG. 4) in which a portion 38 of the pusher dog 34 extends upwardly from and above the conveyor track 16, and a workpiece clearing position (FIG. 5) in which the pusher dog portion 38 is beneath the conveyor track 16. Consequently, with the pusher dog 34 in its upper position, upon extension of the shuttle assembly 22 in the direction of arrow 40 (FIG. 4) by the reciprocating drive means 27, each pusher dog 34 engages a workpiece 18 on the conveyor track 16 at the associated work station 20 and moves the workpiece 18 to the next forward work station 20 on the conveyor track 16. Conversely, upon retraction of the shuttle assembly 22 in the direction of arrow 42 (FIG. 5) from its extended position and with the pusher dogs 34 in their lower position, the pusher dogs 34 will move underneath the workpieces 18 on the track 16.

Figure 6:
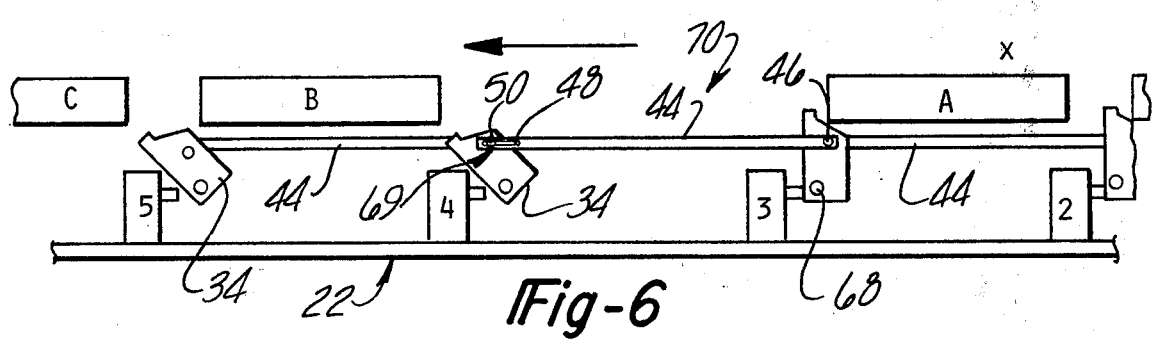
Figure 7:
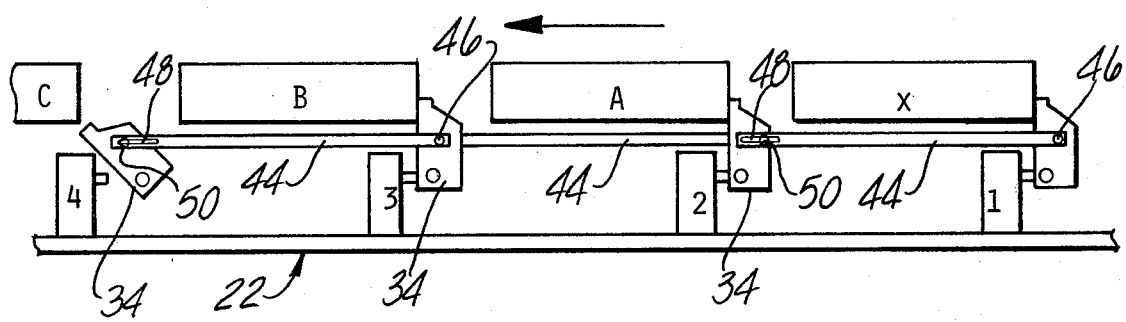

With reference now to FIGS. 6-8, an elongated link bar 44 is pivotally connected by a link bar pivot pin 46 to each pusher dog 34 and extends longitudinally forwardly to the next forward pusher dog 34. An elongated slot 48 (FIG. 7) in the forward end of the link bar 44 is slidably positioned around a pin 50 protruding outwardly from one side of the next forward pusher dog 34. The axis of the link bar pivot pin 46 is radially spaced from the axis of the pusher dog pin 36 so that rotation of the pusher dog 34 from its upper to its lower position will longitudinally shift the forwardly extending link bar 44 a distance corresponding to the length of the link bar slot 48. In order to eliminate interference between the link bar 44 received from the next rearward pusher dog 34 and the link bar 44 extending to the next forward pusher dog 34, the link bars 44 are alternatively positioned on opposite sides of the pusher dog 34. Moreover, the pins 46 and 50 on a single pusher dog 34 are preferably opposite ends of a single elongated rod 52 (FIG. 8).

Figure 5:
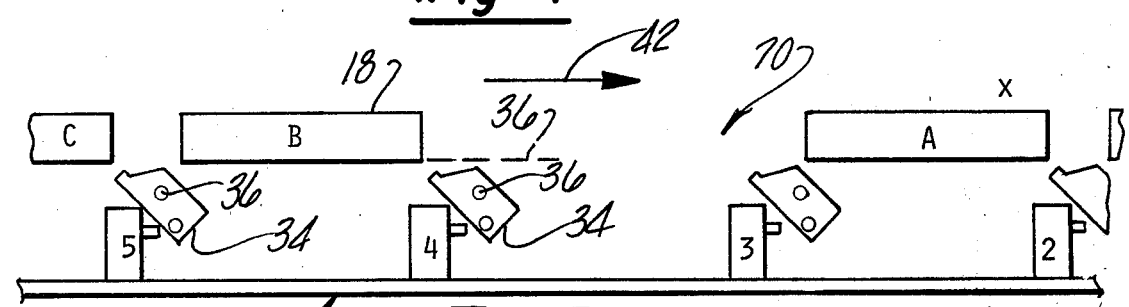

With reference now to FIG. 8, a knockdown means 54 is thereshown for pivoting the pusher dogs 34 from their upper and to their lower position at or near the foremost travel of the shuttle assembly 2. The knockdown means 54 further comprises a lever 56 pivotally mounted to the frame 12 by a pin 58 and urged laterally inwardly by spring means 59 toward the rearwardmost pusher dog 34' of the conveyor system 10. Extension of the shuttle assembly 22 from its retracted and to its extended position merely pivots the lever 56 laterally outwardly and toward the side of the frame 12 as shown in phantom line. At the forwardmost travel of the shuttle assembly 12, however, the free end 60 of the lever 56 registers with a lateral protrusion 62 on the rearwardmost pusher dog 34' so that upon retraction of the shuttle assembly 22, the lever 56 pivots the rearwardmost pusher dog 34' from its upper and to its lower position. This pivotal action of the rearwardmost pusher dog 34' longitudinally shifts its forwardly extending link bar 44 forwardly which pivots the next forward pusher dog 34 to its lower position and so on throughout the entire length of the conveyor system 10. Consequently, as shown in FIG. 5, all of the pusher dogs 34 are in their lower position during the retraction of the shuttle assembly 22 to prevent interference between the pusher dogs 34 and the workpiece 18.

As will be shortly described in greater detail, the conveyor system 10 according to the present invention is an accumulating system in which the pusher dogs 34 are selectively actuated from their lower workpiece clearing position and to the upper workpiece engaging system only when one of the work stations 20 is vacant. When this occurs, the pusher dog 34 at the forwardmost vacent work station 20 and all pusher dogs 34 rearwardly of it are actuated to their upper workpiece engaging position at the most retracted position of the shuttle assembly 22.

The means for selectively actuating the pusher dogs 34 in the above-described fashion is best shown in FIG. 2 and comprises a detector arm 62 pivotally mounted by a pin 64 to the frame 12 at each work station 20. Each detector arm 62 is pivotal between an actuating and nonactuating position and is pivotally connected to the frame 12 so that by gravity the detector arm is urged toward its actuating position in which a portion of the detector arm 62 extends upwardly from and above the conveyor track 16. Conversely, in its nonactuating position, as would occur when the workpiece 18 is positioned at a work station 20, the weight of the workpiece 18 pivots the detector arm 62 to its nonactuating position.

A cam surface 66 is formed at the other and lower end of the detector arm 62 which cooperates with a cam pin 68 extending laterally outwardly from the lower end of the pusher dog 34. With the detector arm 62 in its nonactuating position, the detector arm cam surface 66 is pivoted upwardly from the cam pin 68 when the pusher dog 34 is in its lower workpiece clearing position so that the cam surface 66 does not engage the cam pin 68. Conversely, with the detector arm 62 in its actuating position, the cam surface 66 is pivoted downwardly and engages the cam pin 68 during retraction of the shuttle assembly 22 and just prior to the rearwardmost position of the shuttle assembly 22. Upon engagement of the cam surface 66 with the cam pin 68, the continued retraction of the shuttle assembly 22 pivots the pusher dog 34 around the pin 36 and to its workpiece engaging position.

The actuation of the pusher dog 34 by its associated detector arm 62 in turn longitudinally shifts the rearwardly extending link bar 44 associated with the actuated pusher dog rearwardly thus also pivots the next rearward pusher dog 34 to its upper workpiece engaging position. The actuation of the next rearward pusher dog 34 in turn pivots via its rearwardly extending link bar 44 the pusher dog 34 behind it to its upper position and so on throughout the conveyor system 10. In this manner, all pusher dogs 34 at and rearwardly of the forwardmost vacant work station 20 are actuated or pivoted to their upper workpiece engaging position.

As shown in FIG. 6, the actuation of the pusher dog 34 by the detector arm 62, however, does not actuate or pivot the next forward pusher dog to an upper workpiece engaging position. Instead, the retraction or rearward shift of the link bar 44 extending forwardly from the actuated pusher dog 34 merely slides the link bar 44 along the slot 48 as shown at 69 so that the link bar pin 50 is positioned in the front of the slot 48 rather than the rear of the slot 48.

Although the operation of the conveyor system 10 according to the present invention should by now be apparent, it will be summarized in the interest of clarity and with particular reference to FIGS. 4-7. Assuming that a workpiece 18 is positioned at each work station 20, the pusher dogs 34 are moved to their lower workpiece clearing position at the beginning of retraction from their foremost extension by means of the knockdown means 54 as has been previously described. Upon retraction of the shuttle assembly 22 with the attached pusher dog 34, the detector arms 62 (FIG. 2) are maintained in their nonactuating position by the workpieces 20 so that none of the detector arm cam surfaces 66 engage their cooperating cam pins 68 upon the pusher dogs 34. Consequently, when the conveyor system 10 is filled with a workpiece 18 at each station 20, the pusher dogs 34 remain in their workpiece clearing position during both extension and retraction of the shuttle assembly 22.

Assuming, however, that one station 70 is empty (FIG. 5), during retraction of the shuttle assembly 22, all pusher dogs 34 are in their lower workpiece clearing position. The detector arm 62 at the empty work station 70, however, is in its lower or actuating position so that as the shuttle assembly 22 approaches its rearwardmost position, the detector arm 62 at the empty work station 70 engages the pusher dog cam pin 68 on the pusher dog 34 associated with that empty work station 70 and pivots it upwardly to its workpiece engaging position as shown in FIG. 5. The actuated pusher dog 34 then actuates all pusher dogs 34 rearwardly of it via the link bars 44 but without actuation of the pusher dogs 34 forwardly from it. Rather, the link bar 44 extending forwardly from the actuated pusher dog 34 merely shifts its front slot 48 along the pin 50 as has been previously described.

As shown in FIG. 7, upon extension of the shuttle assembly 22, all workpieces 18 rearwardly of the empty station 70 are incrementally moved forward to the next forward station 20 whereupon the knockdown means 54 (FIG. 8) returns the actuated pusher dogs 34 to their lower workpiece clearing position and the cycle is then repeated.

From the foregoing it can be seen that the accumulating conveyor system according to the present invention provides a simple and yet highly effective accumulating conveyor. Moreover, since the detector arm associated with a given work station actuates only the pusher dog associated with that work station, rather than the next rearwardly pusher dog, the previously known elongated detector arms extending from one work station and to the next rearwardly work station is rendered unnecessary.

Having described our invention, however, many modifications thereto will become apparent to those skilled in the art to which it pertains without deviation from the spirit of the invention as defined by the scope of the appended claims.

We claim:

1. A mechanical automatic accumulating transfer mechanism comprising:
   a frame, said frame comprising a pair of spaced and substantially parallel support rails upon which a series of workpieces can be slidably mounted, said workpiece being positioned at work stations defined along the support rails at spaced intervals;
   a shuttle assembly reciprocably mounted with respect to said frame;
   a plurality of pusher dogs mounted to said shuttle assembly wherein one pusher dog is associated with each work station;
   means for longitudinally reciprocally moving said shuttle assembly with respect to said frame and thus said pusher dogs in unison with each other from their respective associated work station and to the next forward work station, said movement of said shuttle assembly being in a forward and in a rearward direction,
   means pivotally mounting said pusher dogs to said shuttle assembly and being pivotal between an upper, workpiece engaging position and a lower, workpiece clearing position;
   knockdown means for pivoting said pusher dogs to their lower position;
   means for detecting the absence of a workpiece at a station;
   means responsive to said detecting means for actuating the pusher dog associated with the vacant work station from the lower to the upper workpiece engaging position and for pivoting all pusher dogs rearwardly of said vacant work station from their lower to their upper, workpiece, engaging position, said last mentioned means being operable upon movement of said shuttle assembly in a rearward direction.

2. The invention as defined in claim 1 wherein said detector means further comprises a detector arm pivotally connected at a point forward of its balance point to the frame at each work station, each detector arm being pivotal between an actuating position in which a portion at one end of the detector arm extends above the support rails at its associated work station and a nonactuating position in which said detector arm portion is positioned below the support rails at its associated work station, and said pusher dog actuating means comprising cam means connected to the other end of the detector arm which engage a cooperating cam means on the pusher dog associated with the work station during therefor the rearwardmost movement of the pusher dog, said detector arm cam means being operable to pivot said last mentioned pusher dog to its upper position when said detector arm is in its actuating position.

3. The invention as defined in claim 2 wherein said associated cam means comprises a pin extending laterally outwardly from said pusher dog and wherein said detector arm cam means comprises a cam surface formed on the other end of said detection arm.

4. The invention as defined in claim 1 wherein said last mentioned means further comprises an elongated link bar extending longitudinally between each pusher dog and the next forward pusher dog, each link bar having a longitudinally elongated slot at its forward end, said link bar being pivotally connected to the pusher dog, and means for connecting the link bar to the next forward pusher dog, said connecting means further comprising a pin connected to the next forward pusher dog, said pin being longitudinally slidably positioned in the link bar slot.

5. The invention as defined in claim 4 wherin the link bar pin is radially spaced from the pivotal connection of the pusher dog to the mounting means so that pivoting of at least one pusher dog to its lower position longitudinally forwardly shifts the link bar extending forwardly from that pusher dog a predetermined distance to thereby pivot the next forward pusher dog to its lower position.

6. The invention as defined in claim 5 wherein said predetermined distance is substantially the length of the link bar slot.

7. The invention as defined in claim 4 wherein longitudinally adjacent link bars are disposed on opposite lateral sides of the pusher dogs.

8. The invention as defined in claim 1 wherein said knockdown means further comprises a lever secured to said frame, said lever being positioned to abut against a protrustion on the rearwardmost pusher dog of the transfer mechanism at the start of the movement of said shuttle assembly in a rearward direction whereby said lever pivots the rearwardmost pusher dog to its lower position.

9. The invention as defined in claim 1 wherein said said shuttle assembly further comprises an elongated guide member longitudinally slidably mounted to the frame and a plurality of upright members secured to the guide member at spaced intervals wherein one pusher dog is pivotally mounted to each upright member.

* * * * *

UNITED STATES PATENT AND TRADEMARK OFFICE
CERTIFICATE OF CORRECTION

PATENT NO. : 4,411,,355
DATED : October 25, 1983
INVENTOR(S) : James L. Furlette It is certified that error appears in the above—identified patent and that said Letters Patent is hereby corrected as shown below:

Column 3, line 64 delete "member" first occurrence.

Column 5, line 23 delete "vacent" insert --vacant--.

Claim 9, line 45 delete "said".

Signed and Sealed this

Twenty-fourth Day of April 1984

[SEAL]

Attest:

Attesting Officer

GERALD J. MOSSINGHOFF

Commissioner of Patents and Trademarks